Oct. 8, 1940.　　A. W. GELPCKE　　2,217,202
PERCUSSION DRILL
Filed Oct. 19, 1939
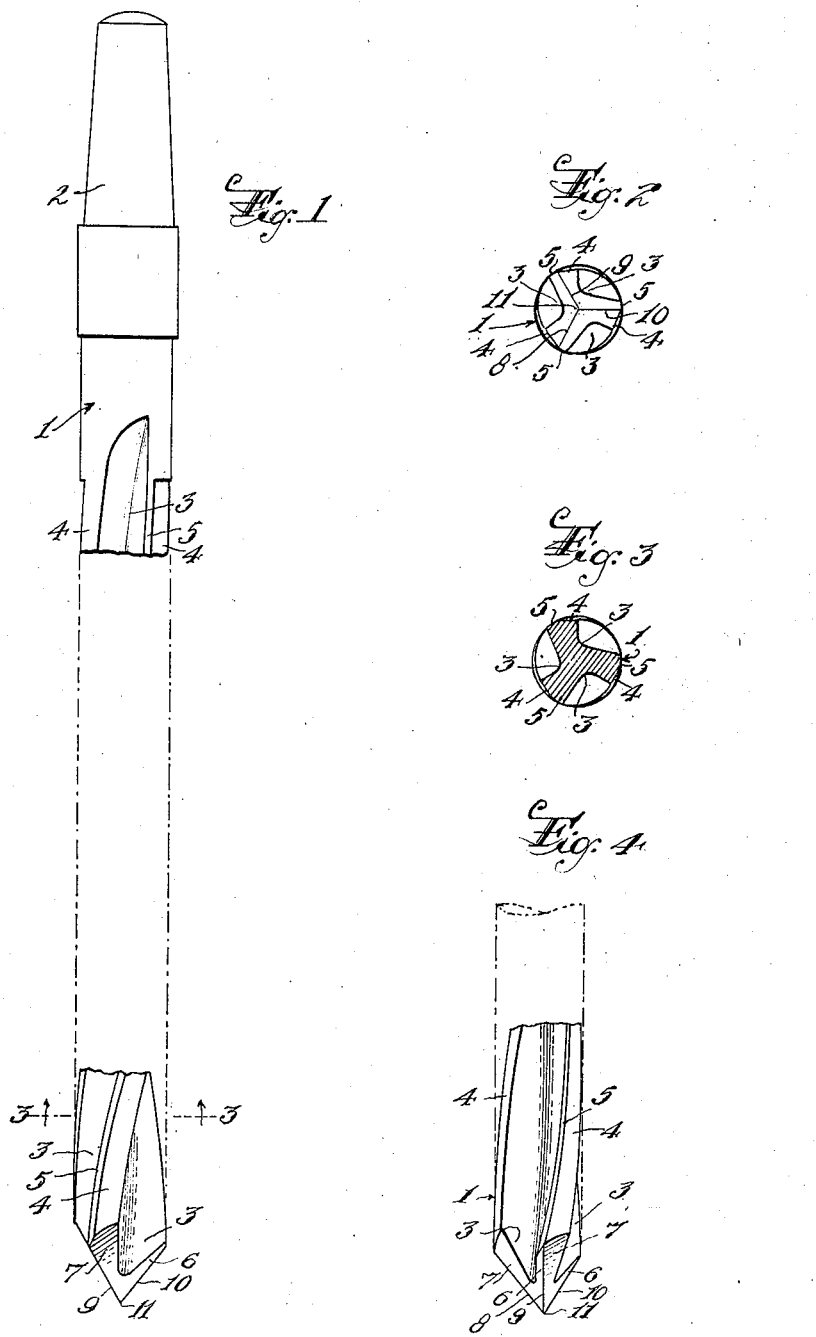
INVENTOR
Alfred W. Gelpcke
BY
A. D. T. Libby
ATTORNEY Patented Oct. 8, 1940

2,217,202

UNITED STATES PATENT OFFICE 2,217,202

PERCUSSION DRILL

Alfred W. Gelpcke, Brooklyn, N. Y., assignor to The Rawlplug Company, Inc., New York, N. Y.

Application October 19, 1939, Serial No. 300,110

3 Claims. (Cl. 255—63)

This invention relates to a percussion drill. In order that the advantages of the drill to be hereinafter described may be more fully and better understood, a short discussion of the prior art seems advisable.

Percussion drills are used in drilling masonry and as heretofore made and used they may be separated into three different classes; namely, the two-, three- and four-point types. The two-point type is an adaptation of a chisel to a masonry drill in which the drill has a square cutting edge and no tapering point. In actual use, this type of drill requires a careful positioning of the drill with each blow or cut in order to form a circular hole. The difficulty in forming a round hole, after a depth of one inch is reached, is due to the tendency of this square two-point design to slide into one position with each blow of the hammer, thereby gradually forming a V-shaped hole in the masonry.

Improvements have been made on this type of drill such as making it like a twist drill; i. e., with two spiral lands and two flutes or grooves intersecting the surface of the drill stock. This acts as a means of carrying out or removing the cuttings of the masonry formed at the bottom of the hole, without the necessity of removing the drill, thereby saving time in the drilling operation. However, the cutting edge of the drill remains a two-point structure, the same as the old chisel drill, the only actual improvement being in the twist formation.

Different ways of grinding these two-flute drills have been suggested, one such being illustrated in McIntosh Patent 1,746,046, issued February 4, 1930, which adds somewhat to the effectiveness of the drill, but for masonry drilling, all these peculiar bevels and cutting edges require very careful grinding for which the average mechanic, drilling holes in stone, is not sufficiently qualified to perform. If such drills are not ground properly the value of these beveled faces is lost and the drills frequently revert to the same design as the original two-point chisels and tend to form a V-shaped hole in the masonry, causing a binding or wedging of the drill therein, or an undersizing of the diameter of the hole formed.

To offset the difficulty in forming a circular hole with a two-point drill, a four-point drill was developed. This drill has four points formed from two lips crossing each other at right angles at the cutting edge. These lips are continued back into the stock of the drill in the form of flutes or lands with the same cross section as the cutting edge. The four-point drill overcomes the difficulty of proper balancing of the drill in the hole when it is cutting. At every blow four corners are cutting at the same time; a slight rotation between each blow changes the position of these cutting corners and tends to maintain a uniform circumference while the tool is cutting.

The great objection to this four-point drill is the difficulty in maintaining a sharp edge. It is exceedingly difficult to grind these right angles formed between the flutes of the drill on an ordinary grinding wheel. Therefore, when the drill has become dull or worn, it is necessary to redress the drill by reheating and reforging. If this operation is not done with suitable care, the temper of the drill is apt to be changed so as to make it impossible to get proper stone cutting.

The three-point drill overcomes many of the objections to the two- and four-point drills and, as heretofore used in practice, the drill in appearance is in the form of a triangle having three straight flutes and lands drawn out and forged from the proper material into three cutting lips or edges on the end of the drill itself. The three flutes are so positioned that it is easy to maintain a circular hole as a perfect balance in the hole is obtained, the same as in the four-point drill; that is to say, the three cutting points are equally distributed around the stock so that with the slightest partial rotation of the drill in the hole, three new positions of cutting are secured, thereby maintaining a uniform circumference and forming a hole so perfectly round that it compares with a hole drilled in softer material with a rotary or twist drill.

One great advantage of the three-point drill is the ease of resharpening, as it is very simple to grind the three faces forming the intersection of the cutting edge between each land or flute. The continual resharpening of these three faces on an ordinary emery wheel may be done by an unskilled workman and the drill will maintain the proper working condition, having a cutting edge of a sharpness equal to a new drill. Such a drill is shown in trade-mark registration No. 355,366, dated March 15, 1938, owned by applicant's assignee, The Rawlplug Company, Inc.

It is the principal object of the present invention to provide a triangular drill which is a decided improvement over the one just described, the improvements residing in a construction wherein the lands and flutes are so arranged and cutting edges ground thereon, that the speed of cutting the masonry is materially increased, and also a construction in which the drill is self-cleaning. My improved type of drill will be understood by reference to the annexed drawing wherein:

Figure 1 is a view in elevation of my improved type of drill.

Figure 2 is a view looking at the cutting end of the drill of Figure 1.

Figure 3 is a view on the line 3—3 of Figure 1.

Figure 4 is a view of the cutting end of the drill turned somewhat from the position shown in Figure 1.

In the various views, 1 is the body of the drill, having a shank 2 adapted to be received in a suitable holder either of the manual or power-driven type. The body of the drill 1 is provided with three spirally arranged flutes 3 separated by three spirally arranged lands 4. Each land is provided longitudinally of its length with a guide rim 5 which is of the full diameter of the drill 1, the diameter of the circle around the guide rims 5 being somewhat greater than the diameter of the circle around the lands 4, as is clearly shown in Figures 2 and 3.

The guide rims 5 reduce the amount of surface of the drill that contacts with the hole and thereby reduce the friction along the length of the drill, but at the same time they also act to maintain a full and true diameter of the hole, it being understood that in a percussion drill, whether operated by hand or power motor, the drill is turned after each blow or a few successions of blows.

The end of the drill is ground into the form of a pyramid having three substantially equal intersecting surfaces meeting at the point 11. Each surface is intercepted in part by its flute 3 so as to form a relatively narrow or thin portion 6 and a broader or thicker portion 7. The cutting edges 8, 9 and 10 meet at the point 11.

As the drill is turned in a left-hand direction, looking at the point of the drill, it will be seen that the narrow or thin portion 6, having the cutting edge 10, becomes the leading cutting edge, while the broader or thicker portion 7 adjacent one of the narrow portions 6 becomes a following surface.

By this construction I have found that the leading side having the thin edge materially increases the speed of cutting the masonry, while the following or thick side of each of the surfaces, which are generally triangular in shape, slides over the surface of the masonry, backing up the cutting edge which protects it from uneven wear. The flutes 3 preferably have a rounded inner contour which, after the drill is operated, acts to automatically carry out, with the least resistance, dust and particles of masonry that are cut off; whereas with a straight flute drill, to which reference has been made, the material is only carried out of the hole by the concussion of the blows, and after the hole gets to a certain depth it becomes clogged by the accumulation of cut material.

The construction herein shown and described provides a drill which is faster-cutting than any of the prior-art drills to which reference has been made and of which I am aware; it is self-cleaning and one which an ordinary mechanic may grind with an ordinary grinder without fear that the ground surfaces will materially differ from those originally provided on the new drill.

What I claim is:

1. A percussion drill having three spiral lands and flutes arcuately spaced, the point of the drill being formed by three flat intersecting surfaces each of which has spaced parts forming the sides of two cutting edges, the parts being spaced by a flute so one part is relatively narrow and forms one side of the leading cutting edge, while the other part is relatively wide and forms the follow-up side of another cutting edge.

2. A percussion drill having three spiral lands and flutes arcuately spaced, the point of the drill being formed by three flat intersecting surfaces forming the sides of a pyramid, the flutes extending into their respective said surfaces so as to form a thin portion on one land and a thick portion on the opposite land.

3. A percussion drill having triple spiral lands and flutes arcuately spaced, the point of the drill being formed by three flat intersecting surfaces forming the sides of a pyramid, each land having a guide rim along the side of a flute, the flutes extending into their respective said surfaces so as to form a thin portion on one land and a thick portion on the opposite land, the meeting of these portions forming relatively thin sharp cutting edges extending from the point into some part of the rim.

ALFRED W. GELPCKE.